United States Patent
Kimoto

(10) Patent No.: US 11,342,772 B2
(45) Date of Patent: May 24, 2022

(54) PRECHARGE CONTROLLER

(71) Applicant: DENSO CORPORATION, Kariya (JP)

(72) Inventor: Yu Kimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 241 days.

(21) Appl. No.: 16/596,943

(22) Filed: Oct. 9, 2019

(65) Prior Publication Data

US 2020/0195016 A1 Jun. 18, 2020

(30) Foreign Application Priority Data

Dec. 17, 2018 (JP) .............................. JP2018-235469

(51) Int. Cl.
*H02J 7/00* (2006.01)
*H02J 7/34* (2006.01)
*B60L 53/60* (2019.01)
*B60K 6/28* (2007.10)

(52) U.S. Cl.
CPC ............... *H02J 7/007* (2013.01); *B60K 6/28* (2013.01); *B60L 53/60* (2019.02); *B60Y 2200/91* (2013.01); *B60Y 2200/92* (2013.01); *B60Y 2300/91* (2013.01); *H02J 7/345* (2013.01)

(58) Field of Classification Search
CPC ........... H02J 7/007; H02J 7/345; B60L 53/60; B60K 6/28; B60Y 2200/91; B60Y 2200/92; B60Y 2300/91
USPC .......................................... 307/19, 10.1, 9.1
See application file for complete search history.

(56) References Cited

U.S. PATENT DOCUMENTS

| | | | | |
|---|---|---|---|---|
| 2016/0042900 | A1* | 2/2016 | Ozaki | ................... B60L 50/51 361/160 |
| 2016/0152151 | A1* | 6/2016 | Yang | ....................... H02J 3/32 320/109 |
| 2017/0334304 | A1* | 11/2017 | Steele | ..................... B60L 53/62 |
| 2019/0143830 | A1* | 5/2019 | Makino | ...................... H02J 7/00 307/10.1 |
| 2019/0359078 | A1* | 11/2019 | Yamada | ................. H01M 10/48 |
| 2020/0122584 | A1* | 4/2020 | Zhang | ....................... B60L 1/00 |

FOREIGN PATENT DOCUMENTS

| | | | |
|---|---|---|---|
| JP | H10-304501 | A | 11/1998 |
| JP | 2006-238509 | A | 9/2006 |
| JP | 2006246564 | A | 9/2006 |
| JP | WO 2013/150825 | * | 10/2013 |
| JP | 2015220825 | A | 12/2015 |
| JP | 2018-157662 | A | 10/2018 |
| WO | WO 2013-150825 | * | 10/2013 |

* cited by examiner

*Primary Examiner* — Daniel Cavallari
*Assistant Examiner* — Swarna N Chowdhuri
(74) *Attorney, Agent, or Firm* — Posz Law Group, PLC

(57) ABSTRACT

A precharge controller includes a main contactor, a capacitor, a precharge contactor, a current sensor, and a control unit. When starting a power supply from a battery to load, the control unit starts precharging by closing the precharge contactor when a detected current is equal to a preset value or lower, determines completion of precharging when the detected current once equal to or exceeded a first threshold value falls to a second threshold value or lower, and closes the main contactor.

12 Claims, 4 Drawing Sheets

PRECHARGE CONTROLLER

CROSS REFERENCE TO RELATED APPLICATION

The present application is based on and claims the benefit of priority of Japanese Patent Application No. 2018-235469, filed on Dec. 17, 2018, the disclosure of which is incorporated herein by reference.

TECHNICAL FIELD

The present disclosure generally relates to a precharge controller configured to precharge a smoothing capacitor connected in parallel with a load before closing a main contactor that conducts a power supply path from a battery to the load.

BACKGROUND INFORMATION

In the related art, a precharge controller includes (i) a main contactor provided in a power supply path from a battery to a load and (ii) a precharge contactor connected in parallel with the main contactor, and forming another power supply path via a current limiting resistor.

Then, when a power supply from the battery to the load is started, the precharge contactor is closed to start precharging to the smoothing capacitor connected in parallel with the load. After the start of precharging, it is determined whether or not the precharging current after a predetermined time from the start of precharging is equal to or less than a reference value. If the precharging current is equal to or less than the reference value, it is determined that the precharging is complete. Then, the main contactor is closed and the drive of the load is allowed.

Thus, when starting the power supply from the battery to the load, the reason for performing the precharging to the capacitor is to protect the main contactor by suppressing an inrush current that flows when the main contactor is closed.

However, in the related art, completion of precharging is determined based on a current value after a predetermined time from the start of precharging. Therefore, a determination regarding whether the precharging is complete is not appropriately performable when a current sensor fails.

That is, since the electric current cannot be detected when the current sensor is broken, the main contactor is closed in a state where the precharging is not complete, and a large current flows in the main contactor in such a state, which may cause the main contactor to fail.

SUMMARY

It is an object of the present disclosure to provide a precharge controller which closes a precharge contactor and precharges a capacitor before closing a main contactor, capable of preventing a false determination of completion of precharge even when a current sensor fails.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, an embodiment of the present disclosure is described with reference to the drawings.

[Embodiment]

[1. Configuration]

Figure 1:
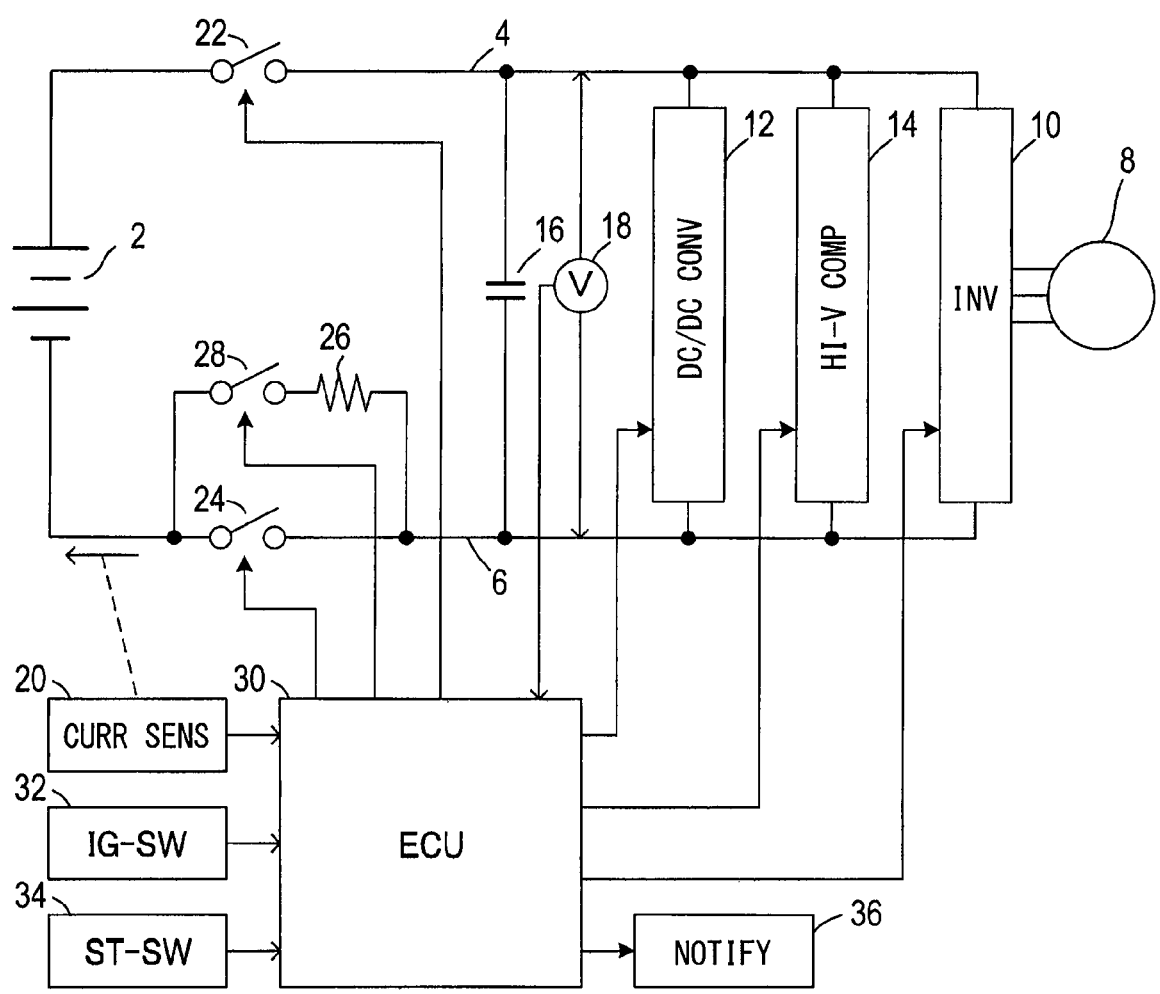
FIG. 1 is a block diagram of a power supply system of a vehicle in one embodiment of the present disclosure.

A power supply system of the present embodiment shown in FIG. 1 is to draw a power supply from the battery 2 mounted on an electric vehicle or a hybrid vehicle to a motor 8 serving as a power source of the vehicle through a positive terminal side power supply path 4 and a negative terminal side power supply path 6, for a supply of electric power to an inverter 10 and the like that control a supply of electric current.

In addition to the inverter 10, the power supply paths 4 and 6 on the positive terminal and negative terminal sides have, as a load, a DC/DC converter 12 converting a high voltage, for example, 250 V, supplied from the battery 2 to a predetermined low voltage, for example, 12 V, and other high voltage system components 14 connected thereto.

On the positive terminal side power supply path 4 and the negative terminal side power supply path 6, a smoothing capacitor 16 is provided to absorb voltage fluctuations between the power supply paths 4 and 6, as well as a voltage sensor 18 to detect a voltage across two terminals of the capacitor, respectively in parallel connection with the loads 10 to 14.

In addition, a positive side contactor 22 and a negative side contactor 24 for connecting and disconnecting the power supply paths 4 and 6 are provided respectively on the positive and negative side power supply paths 4 and 6 from the battery 2 to the respective loads 10 to 14 including the capacitor 16.

Therefore, a high voltage is applied from the battery 2 to the respective loads 10 to 14 including the capacitor 16 by closing the two contactors 22 and 24 and making the power supply paths 4 and 6 conductive.

Further, from among the two contactors 22 and 24, the negative side contactor 24 has a precharge contactor 28 connected in parallel via a resistor 26 for limiting the electric current. In the present embodiment, the negative side contactor 24 corresponds to a main contactor of the present disclosure. In the following description, the positive side contactor 22 is described as SMR-B, the negative side contactor 24 is described as SMR-G, and the precharge contactor 28 is described as SMR-P. SMR is an abbreviation of system main relay.

Therefore, when the SMR-P 28 and the SMR-B 22 are closed, a power supply path to each of the loads 10 to 14 including the capacitor 16 is formed via the resistor 26.

The SMR-P 28 forms a power supply path via the resistor 26 when the power supply system is activated, thereby supplying a charging current to the capacitor 16 for precharging the capacitor 16. The SMR-P 28 is switched between ON/OFF states by an ECU 30 serving as a control unit, together with the SMR-B 22 and the SMR-G 24.

The ECU 30 is an electronic control unit, and is configured to have a microcomputer including a CPU, a ROM, and a RAM. When an ignition switch, hereinafter referred to as IG-SW 32, of the vehicle is in an ON state, the ECU 30 operates by receiving power supply from a low voltage battery mounted on the vehicle.

Further, when a starter switch, hereinafter referred to as ST-SW 34 of the vehicle is operated when the IG-SW 32 is in the ON state, the ECU 30 assumes that a start instruction of the power supply system is input, thereby performing a precharge control process shown in FIG. 2.

In addition, since the low voltage battery used as the power supply of the ECU 30 is charged by a low voltage generated by the DC/DC converter 12, the ECU 30 is prevented from becoming inoperable due to the discharge of the low voltage battery.

Next, in addition to the above-described voltage sensor 18, the IG-SW 32, and the ST-SW 34, a current sensor 20 and a notification unit 36 are connected to the ECU 30.

The current sensor 20 is configured to detect the electric current flowing in a portion of the negative terminal side power supply path 6 connecting the SMR-G 24 and SMR-P 28 serving as the main contactor and the negative terminal of the battery 2, that is, in a battery side portion of the path 6.

Further, the notification unit 36 is a device for notifying abnormality when an abnormality of the current sensor 20 or the like is detected in a precharge control process described later. Such a notification for a driver of the vehicle may be provided by a warning sound generator for audible warning and/or a display unit for a display of contents of abnormality.

Figure 2:
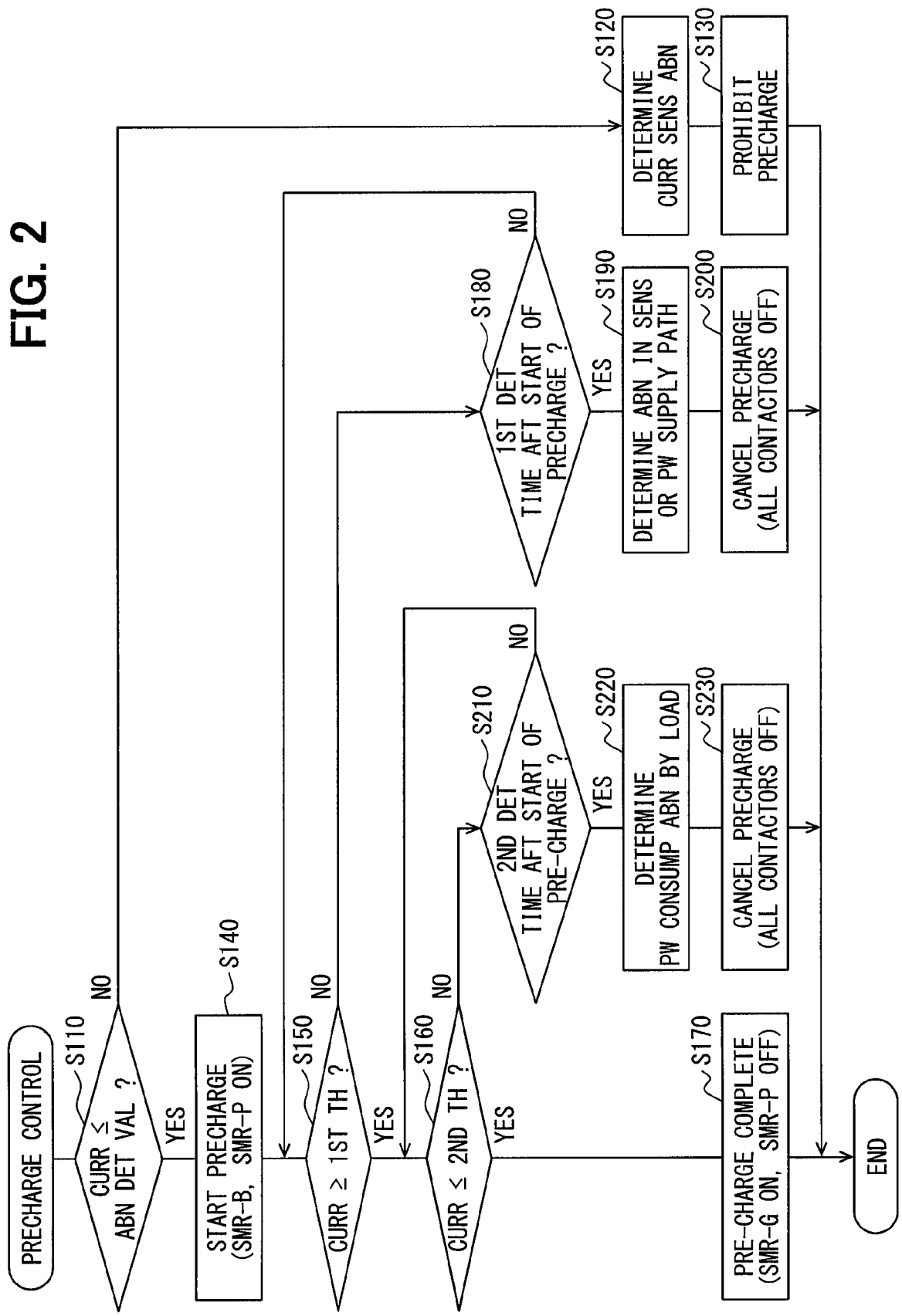
FIG. 2 is a flowchart of a precharge control process performed by an electronic control unit.

Then, the ECU 30 functions as the precharge controller of the present disclosure by performing the precharge control process shown in FIG. 2 based on the detected current obtained as a detection signal of the current sensor 20.

That is, the ECU 30, which is the control unit of the present disclosure, performs a failure determination of the current sensor 20 and a precharge completion determination of the precharging to the capacitor 16 based on the electric current detected by the current sensor 20 in the precharge control process.

Further, the ECU 30 starts precharging to the capacitor 16 by closing the SMR-P 28 and SMR-B 22 in the precharging control process, and closes the SMR-G 24 when it is determined that the precharging is complete, and allows each of the load 10 to 14 to be driven.

[Precharge Control Process]

Next, the precharge control process performed by the ECU 30 is described.

As shown in FIG. 2, when the precharge control process is started, first, in S110, it is determined whether or not the current value of the detected current detected by the current sensor 20 is equal to or less than a predetermined abnormality determination value.

That is, if the current sensor 20 is normal when both of the SMR-P 28 and the SMR-G 24 are in the open state, that is, in an OFF state, the current value detected by the current sensor 20 is "0." Thus, in S110, based on the current value, it is determined whether the current sensor 20 is broken. Therefore, a predetermined current value near "0" or "0" itself is set as the abnormality determination value used in S110.

If it is determined in S110 that the current value detected by the current sensor 20 exceeds the abnormality determination value, the process proceeds to S120, and it is determined that the current sensor 20 is broken, and a current sensor failure determination process is performed to notify the sensor failure by using the notification unit 36.

Then, subsequently in S130, since the current sensor 20 is broken, the precharging to the capacitor 16 is prohibited, and the precharging control process is ended.

Next, when it is determined that the current value of the detected current detected by the current sensor 20 is equal to or less than the abnormality determination value in S110, it means that the current sensor 20 is normal, and thus the process proceeds to S140, and precharging is started. The start of precharging is caused by closing the SMR-P 28 and the SMR-B 22, that is, by the turning ON of them, as shown in FIG. 3.

Figure 3:
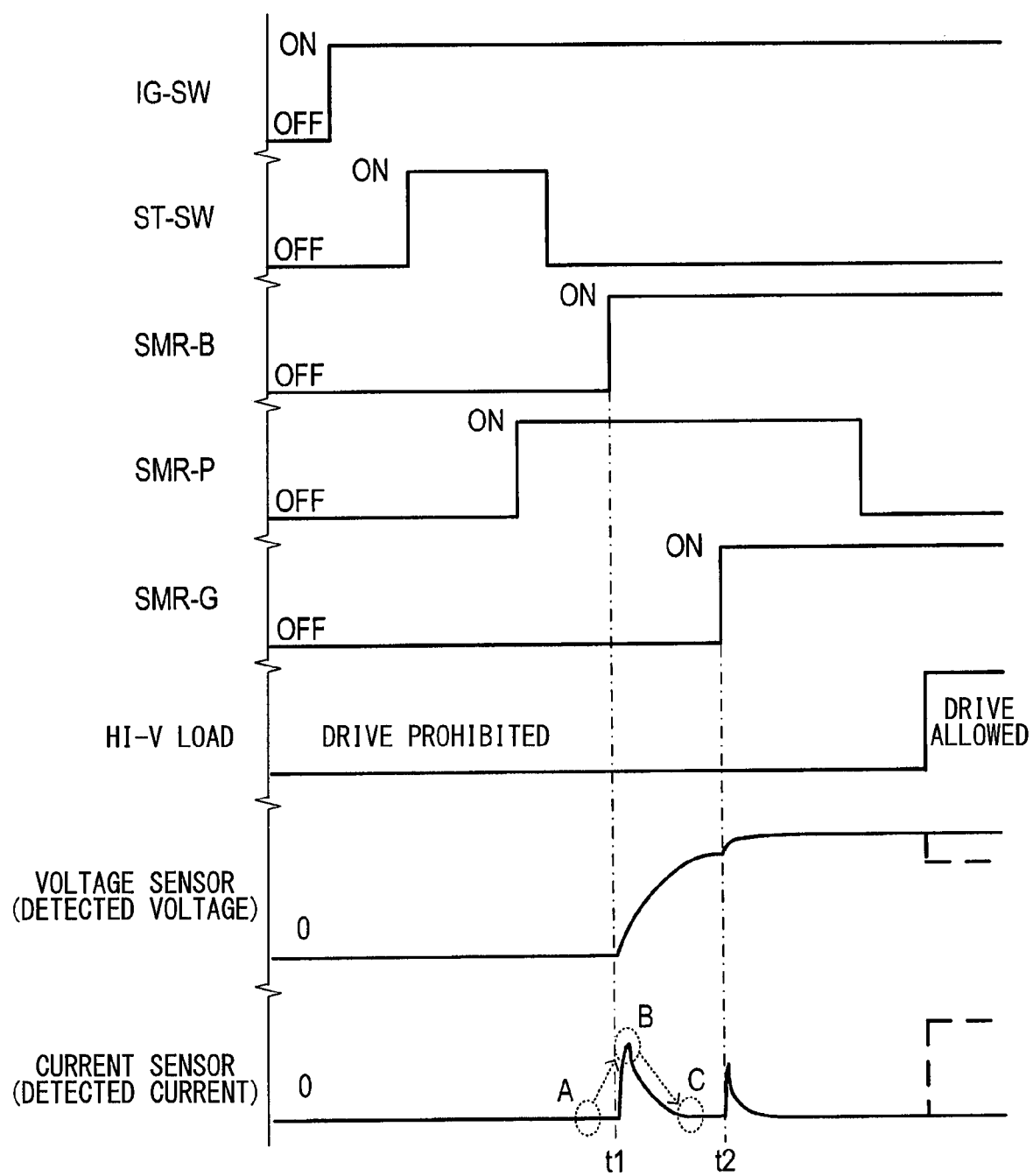
FIG. 3 is a time chart of a control operation of a precharge contactor and a main contactor by the precharge control process.

Although FIG. 3 describes that the SMR-P 28 and SMR-B 22 are sequentially, one by one, switched to the ON state when precharging is started at time t1, the SMR-P 28 and the SMR-B 22 may simultaneously be switched to the ON state. Alternatively, the SMR-B 22 and the SMR-P 28 may be switched to the ON state in this written order.

As described above, when precharging to the capacitor 16 is started in S140, the process proceeds to S150, and it is determined whether the current value of the detected current detected by the current sensor 20 is equal to or greater than the first threshold value set in advance for the precharge performance determination.

That is, as shown in FIG. 3, when SMR-B 22 and SMR-P 28 are turned ON and precharging is started at time t1, an electric current flows in the capacitor 16, thereby the detected current steeply rises from "0" in region A to a large current in region B.

Therefore, in S150, it is determined whether the precharging to the capacitor 16 has started normally by determining whether the current value of the detected current has become equal to or greater than the first threshold value. When it is determined in S150 that the current value of the detected current has become equal to or greater than the first threshold value, the process proceeds to S160, and it is determined whether the current value of the detected current detected by the current sensor 20 becomes equal to or less than a predetermined second threshold value for a precharge completion determination.

The process of S160 is a process of determining that (i) the charging current to the capacitor 16 is lowered to near "0" in region C shown in FIG. 3 by the precharging, and (ii) the precharging to the capacitor 16 is complete. Therefore, a current value smaller than the first threshold value used in the determination process in S150 is set in advance as the second threshold value used in the determination process in S160. However, the second threshold value may be the same as the first threshold value.

Subsequently, when the current value of the current detected by the current sensor 20 becomes equal to or less than the second threshold value, and it is determined in S160 that the precharging is complete, the process proceeds to S170 and the SMR-G 24 is switched to the ON state. As a result, an electric power can be supplied to each of the loads 10 to 14 and the capacitor 16 through the power supply paths 4 and 6 without limiting the electric current by the resistor 26.

Note that in S170, as shown in FIG. 3, the SMR-G 24 as a main contactor is turned ON at time t2 in accordance with the completion determination of precharging, and then the SMR-P 28 is turned OFF to allow drive of each of the load 10 to 14.

Next, when it is determined in S150 that the current value of the detected current is less than the first threshold value, the process proceeds to S180, and it is determined whether or not a first determination time of preset duration for a precharge performance determination has elapsed after precharging is started in S140.

When it is determined in S180 that the first determination time has not elapsed, the process proceeds to S150, and when it is determined that the first determination time has elapsed, the process proceeds to S190. In S190, since the detected current does not become equal to or greater than the first threshold value even after the first determination time has elapsed after the start of precharging, it is determined that either the current sensor 20 or the power supply paths 4 and 6 has an abnormality, and an abnormality notification is performed via the notification unit 36.

Then, subsequently in S200, since there is an abnormality in the current sensor 20 or the power supply paths 4 and 6, all the SMR-B 22, SMR-G 24, and SMR-P 28 are turned OFF to stop the precharging, and the precharge control process is ended.

When it is determined in S160 that the current value of the detected current exceeds the second threshold value, the process proceeds to S210, and it is determined whether a second determination time of preset duration for a precharge completion determination has elapsed after precharging is started in S140.

When it is determined in S210 that the second determination time has not elapsed, the process proceeds to S160, and when it is determined that the second determination time has elapsed, the process proceeds to S220. Needless to say, a duration longer than the first determination time is set as the second determination time.

In S220, it is determined that a power consumption abnormality is caused due to the load of the high voltage system components 14 and the like connected to the power supply paths 4 and 6, and the notification regarding the situation is provided via the notification unit 36. Then, subsequently in S230, since the power consumption abnormality due to the load of the high voltage system components 14 and the like has occurred, all of the SMR-B 22, SMR-G 24 and SMR-P 28 are turned OFF to stop the precharging, and the precharge control process is ended.

[Effects]

As described above, the ECU 30 performs the precharge control process immediately after the activation of the power supply system. Then, in the precharge control process, the capacitor 16 is precharged by closing the SMR-P 28 and the SMR-B 22, and after the precharge is complete, the SMR-G 24 is closed to allow the drive of the load.

Therefore, according to the present embodiment, by precharging the capacitor 16, a flow of a large current to the SMR-B 22 and the SMR-G 24 is prevented, thereby preventing the failure of the SMR-B 22 and the SMR-G 24

Further, the ECU 30 determines, before starting the precharging, whether or not the current sensor 20 is abnormal by determining whether the current value detected by the current sensor 20 is equal to or less than the abnormality determination value. When it is determined that the current sensor 20 is abnormal in the above-described manner, notification regarding such determination is provided for the driver, for example, and precharging is prohibited.

Therefore, a problematic situation, in which precharging is started when not noticing that the current sensor 20 is broken and end of precharging is undeterminable based on the detected current detected by the current sensor is prevented.

That is, in the above-described related art device, precharging is started without determining the failure of the current sensor, and, if the current value detected after a predetermined time has elapsed is equal to or less than the predetermined threshold for precharge completion determination, it is assumed that precharging is complete, and the main contactor is made conductive.

Figure 4:
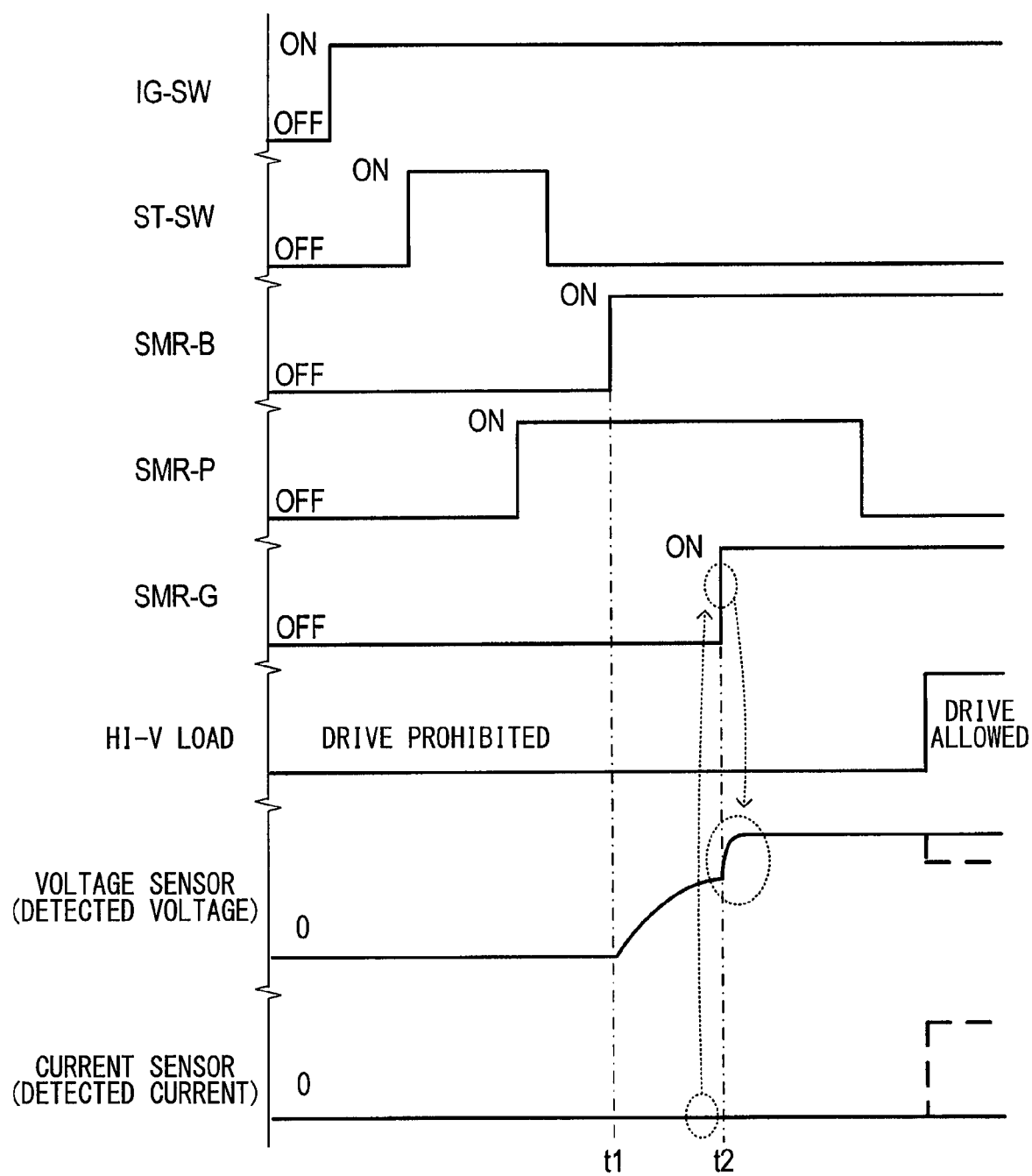
FIG. 4 is a time chart of a control operation of a precharge contactor and a main contactor at a current sensor failing time by a related art device.

Therefore, in the related art device, as shown in FIG. 4, the main contactor may be turned ON at time t2 when a predetermined time has elapsed after the start of precharging, even though the capacitor has not yet sufficiently been precharged. When the main contactor is turned ON in such manner, a large current flows due to a voltage difference between the capacitor and the battery, and the main contactor may be broken.

On the other hand, in the present embodiment, the failure determination of the current sensor 20 is performed before starting the precharging, and the precharging is prohibited when the current sensor 20 is determined as failed, thereby the occurrence of an above-described problem is preventable. Further, the occupant of the vehicle can detect the failure of the current sensor 20 by the notification from the notification unit 36, and is prompted to replace the broken component with a normal component.

Next, after the precharging is started, the ECU 30 determines that the precharging is complete when the current detected by the current sensor 20 once becomes the first threshold value or more and then becomes the second threshold value or less, thereby turns ON SMR-G 24 and allows the drive of the load.

Therefore, according to the present embodiment, the precharge completion determination after the start of precharging can be performed more accurately than the related art device described above, for the turning ON of the SMR-G 24 that serves as a main contactor.

Therefore, according to the present embodiment, by preventing a false determination of the completion of precharging, a problem accompanying the false determination of the completion of precharging, such as a large current flowing in the SMR-G 24 due to the turning ON of the SMR-G 24 at a wrong timing, is preventable, thereby preventing the failure of the SMR-G 24.

Further, when the current value does not become equal to or greater than the first threshold value even after the lapse of the first determination time from the start of precharging, the ECU 30 determines that an abnormality has occurred in the current sensor 20 or in the power supply paths 4 and 6, thereby cancelling the precharging and notifying such abnormality to the occupant of the vehicle.

Further, even after normally starting the precharging, if the current value does not fall below the second threshold value before the lapse of the second determination time from the start of precharging, it is determined by the ECU 30 that a power consumption abnormality by the load has been caused. Then, such an abnormality determined in the above is notified to the occupant of the vehicle, with the cancellation of the precharging.

Therefore, according to the present embodiment, when any of the current sensor 20, the power supply paths 4 and 6, and the load is abnormal, not only stopping the precharging and interrupting the power supply paths 4 and 6, but also notification to the vehicle occupant of a suspected failed component is performed for prompting the repair of the vehicle.

(Other Embodiments)

While one embodiment of the present disclosure has been described above, the present disclosure is not limited to the embodiment described above and can be carried out with various modifications.

For example, in the above embodiment, when it is determined in S110 that the current value exceeds the abnormality determination value in the precharge control process, the process proceeds to S120 and the failure of the current sensor 20 is determined.

On the other hand, if it is determined in S110 that the current value exceeds the abnormality determination value, it may be determined whether or not a predetermined time has elapsed after the start of the precharge control process, and, when the predetermined time has not yet elapsed, the determination process of S110 may be performed again. In such manner, even when the output of the current sensor 20 temporarily becomes unstable immediately after the start of the power supply system, the erroneous determination of the failure of the current sensor 20 in S120 is preventable.

Further, in the above embodiment, the main contactor with which the SMR-P 28, i.e., a precharge contactor, is connected in parallel, is described as the SMR-G 24 provided in the power supply path 6 on the negative terminal side.

On the other hand, the main contactor with which the SMR-P 28 is connected in parallel may be the SMR-B 22 provided in the power supply path 4 on the positive terminal side. In this case, precharging to the capacitor 16 may be performed by the turning ON of both of the SMR-P 28 and the SMR-G 24, and the SMR-B 22 may be turned ON after the precharge completion determination, for obtaining the same effects as the above embodiment.

Further, in the above embodiment, it is described that the ECU 30 as the control unit is configured as having a microcomputer, and the function as the control unit is realized by the precharge control process which is performed by the ECU 30, such as by an execution of a computer program. On the other hand, the control unit of the present disclosure may be configured to realize part or all of the functions by using a plurality of hardware components.

Further, a plurality of functions of one component in the above embodiment may be realized by a plurality of components, or one function of one component may be realized by a plurality of components. Further, a plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with a different part of the configuration of the above embodiment.

Further, the present disclosure may be realized in various forms, other than a precharge controller used for a power supply system of a vehicle, such as a program for causing a computer to function as a control unit of the precharge controller, a non-transitory, substantial storage medium such as a semiconductor memory for storing such a program, a precharge control method and the like.

What is claimed is:

1. A precharge controller comprising:
   a main contactor provided on a power supply path from a battery to a load;
   a capacitor connected in parallel with the load for smoothing;
   a precharge contactor connected in parallel with the main contactor via a current limiting resistor;
   a current sensor configured to detect an electric current flowing in a portion of the power supply path on a battery side of the main contactor and the precharge contactor; and
   a control unit configured to control a start of power supply from the battery to the load (i) by closing the precharge contactor first for precharging the capacitor and (ii) by subsequently closing the main contactor upon completion of the precharge of the capacitor for allowing a drive of the load, wherein,
   the control unit
      starts the precharging when a detected current detected by the current sensor is equal to or lower than a predetermined current;
      determines that the precharging is complete when, after the start of the precharging, the detected current detected by the current sensor
         rises to be equal to or greater than a first threshold value for a precharge performance determination, and
         falls thereafter to be equal to or lower than a second threshold value for a precharge completion determination;
      prior to determining that the detected current detected by the current sensor rises to be equal to or greater than the first threshold value for the precharge performance determination, repeatedly determine that a first determination time of preset duration after the start of precharging has not elapsed; and
      prior to determining that the detected current detected by the current sensor falls thereafter to be equal to or lower than the second threshold value for the precharge completion determination, repeatedly determine that a second determination time of preset duration after the start of precharging has not elapsed.

2. The precharge controller of claim 1, wherein
the control unit is configured to prohibit the precharge based on a determination that the current sensor is broken when the detected current before starting the precharge is not equal to or lower than the predetermined current.

3. The precharge controller of claim 1, wherein
the control unit is configured to stop the precharge based on a determination that the current sensor or the power supply path has abnormality when the detected current stays under/below the first threshold value for at least the first determination time after starting the precharge.

4. The precharge controller of claim 1, wherein
the control unit is configured to stop the precharge based on a determination that the load has abnormality when the detected current stays above the second threshold value for at least the second determination time after starting the precharge.

5. The precharge controller of claim 1, wherein
the control unit starting the precharging occurs upon a condition being satisfied that the detected current detected by the current sensor is equal to or lower than the predetermined current.

6. The precharge controller of claim 1, wherein
the control unit starting the precharging occurs after a condition is satisfied that the detected current detected by the current sensor is equal to or lower than the predetermined current.

7. The precharge controller of claim 1, wherein:
the control unit starting the precharging occurs at an initial time, and
the control unit determines that the precharging is complete upon:
   at second time later than the initial time, the detected current detected by the current sensor rises to be equal to or greater than the first threshold value for the precharge performance determination, and at a third time later than the second time, the detected current detected by the current sensor falls to be equal to or lower than the second threshold value for the precharge completion determination.

8. The precharge controller of claim 1, wherein
the predetermined current is different from the first threshold value for the precharge performance determination.

9. A precharge controller configured to control a system, the system including:
a positive switch,
a negative switch,
a precharge series including a precharge switch and a resistor, the precharge series being in parallel with the negative switch,
a smoothing capacitor,
a voltage sensor configured to measure a capacitor voltage across the smoothing capacitor, and
a current sensor configured to sense a return current returning to a power source,
the precharge controller comprising:
a processor; and
a non-transitory computer-readable storage medium, wherein the precharge controller is configured to perform a precharge process including:
(i) determining the return current is less than or equal to an abnormality determination value,
(ii) starting the precharge process by turning on the precharge switch, and then turning on the positive switch;
(iii) firstly determining that the return current is greater than or equal to a first threshold;
(iv) prior to the first determination, repeatedly determining that a first determination time of preset duration after starting the precharge process has not elapsed;
(v) secondly determining that the return current is less than or equal to a second threshold; and
(vi) prior to the second determination, repeatedly determining that a second determination time of preset duration after starting the precharge process has not elapsed.

10. The precharge controller of claim 9, wherein
the precharge process further includes:
determining that the return current is not greater than or equal to the first threshold,
determining that the first determination time has passed after starting the precharge process,
determining that a first abnormality has occurred in at least one of the voltage sensor or a power supply path, and
canceling the precharge process by turning off the precharge switch and the positive switch.

11. The precharge controller of claim 9, wherein
the precharge process further includes:
determining that the return current is not less than or equal to the second threshold, the second threshold being less than the first threshold,
determining that the second determination time has passed after the start of the precharge process,
determining that a power consumption abnormality has occurred, and
canceling the precharge process by turning off the precharge switch and the positive switch.

12. The precharge controller of claim 9, wherein
the precharge process further includes:
determining that the precharge process is complete, and
turning on the negative switch, and then turning off the precharge switch.

* * * * *